US010458467B2

(12) United States Patent
Nara et al.

(10) Patent No.: US 10,458,467 B2
(45) Date of Patent: Oct. 29, 2019

(54) CROSS ROLLER BEARING

(71) Applicant: NIPPON THOMPSON CO., LTD., Tokyo (JP)

(72) Inventors: Tsuguyoshi Nara, Mino (JP); Satoshi Sasaki, Mino (JP); Masashi Matsui, Mino (JP); Ryota Nakanishi, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 16/104,346

(22) Filed: Aug. 17, 2018

(65) Prior Publication Data

US 2019/0063501 A1    Feb. 28, 2019

(51) Int. Cl.
| | |
|---|---|
| *F16C 19/36* | (2006.01) |
| *F16C 35/04* | (2006.01) |
| *F16C 33/34* | (2006.01) |
| *F16C 33/58* | (2006.01) |
| *F16C 43/06* | (2006.01) |

(52) U.S. Cl.
CPC ........... *F16C 19/362* (2013.01); *F16C 33/34* (2013.01); *F16C 33/583* (2013.01); *F16C 33/586* (2013.01); *F16C 35/045* (2013.01); *F16C 43/06* (2013.01); *F16C 33/585* (2013.01); *F16C 2226/60* (2013.01)

(58) Field of Classification Search
CPC ...... F16C 19/362; F16C 33/34; F16C 33/583; F16C 33/586; F16C 35/045; F16C 2226/60
See application file for complete search history.

(56) References Cited

U.S. PATENT DOCUMENTS

| | | | | |
|---|---|---|---|---|
| 3,361,501 A | * | 1/1968 | Messinger | ............ F16C 19/362 |
| | | | | 384/620 |
| 3,720,987 A | * | 3/1973 | Dubost | .................. B22D 13/00 |
| | | | | 29/898.066 |
| 5,104,239 A | * | 4/1992 | Sague | ..................... F16C 19/38 |
| | | | | 29/898.01 |

FOREIGN PATENT DOCUMENTS

| | | | |
|---|---|---|---|
| DE | 19832901 | * | 1/2000 |
| FR | 2190208 | * | 6/1972 |
| JP | 04078328 U1 | | 7/1992 |
| JP | 2009-287587 A | | 12/2009 |
| JP | 2016-019447 A | | 2/2016 |

* cited by examiner

*Primary Examiner* — James Pilkington
(74) *Attorney, Agent, or Firm* — Browdy and Neimark, PLLC

(57) ABSTRACT

In a cross roller bearing, an outer ring and an inner ring have respective mounting portions formed thereon in such a manner as to reduce the radial thickness of the bearing to thereby reduce weight. The cross roller bearing has rollers and separators disposed in a load-carrying race formed between the outer ring and the inner ring. The outer ring and the inner ring have the respective mounting portions located axially away from respective raceway surfaces. The outer circumferential surface of the outer ring and the inner circumferential surface of the inner ring are flat. The mounting portion of the outer ring does not radially protrude from the inner circumferential surface of the inner ring, and the mounting portion of the inner ring does not radially protrude from the outer circumferential surface of the outer ring.

6 Claims, 9 Drawing Sheets

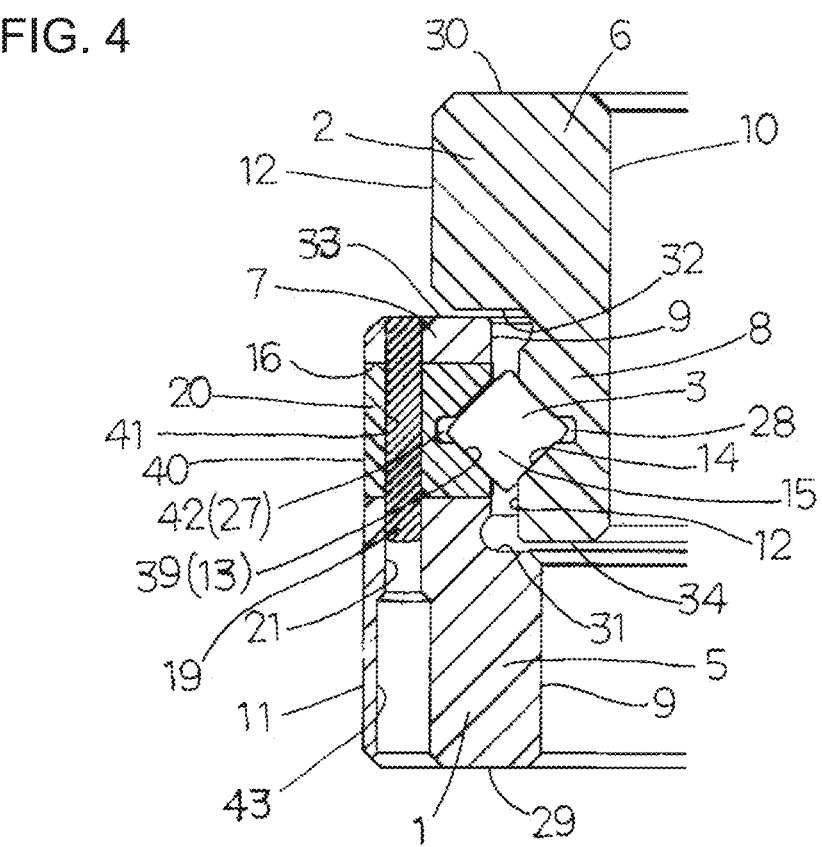

CROSS ROLLER BEARING

FIELD OF THE INVENTION

The present invention relates to a thin-type cross roller bearing which comprises an outer ring, an inner ring, and rolling elements; in which the outer ring and the inner ring have respective mounting portions for mounting mating members; and in which a total wall thickness of the outer ring and the inner ring is reduced to the greatest possible extent.

BACKGROUND OF THE INVENTION

In recent years, cross roller bearings have been incorporated in turning portions and swinging portions of industrial robots, machine tools, medical instruments, optical instruments, etc. Cross roller bearings of various types and sizes have been commercialized for various applications. Particularly, thin-walled cross roller bearings have contributed to reduction in size and weight of machinery.

For example, an ultrathin-type cross roller bearing disclosed by the applicant of the present application is used in industrial robots, optical instruments, medical instruments, etc. The ultrathin-type cross roller bearing can reduce overall size and weight through impartment of an ultrathin wall thickness to an outer ring and an inner ring. The ultrathin-type cross roller bearing employs circular columnar separators disposed between rollers so as to maintain the rollers in an appropriate posture, reduces the size and weight of the bearing to the greatest possible extent, and ensures reliable lubrication. The ultrathin-type cross roller bearing comprises the outer ring, the inner ring, the rollers intervening between the outer ring and the inner ring, and the separators disposed between the rollers (see, for example, Japanese Patent Application Laid-Open No. 2009-287587.)

Also known is a hollow actuator used in joints of industrial robots, etc. A rolling bearing provided in the known hollow actuator employs an inner ring and an outer ring, both of which have threaded holes formed therein. An output plate and an ultrasonic motor are attached to the rolling bearing such that the ultrasonic motor is attached to one side of the outer ring, while the output plate is attached to the other side of the inner ring, thereby preventing entry into the rolling bearing of abrasion powder generated by the ultrasonic motor (see, for example, Japanese Patent Application Laid-Open No. 2016-19447).

There is known a cross roller bearing for rotatably supporting rotation shafts of various instruments and devices. The cross roller bearing includes an inner ring and a two-piece outer ring. The cross roller bearing is configured as follows: in order to facilitate positioning of the two pieces of the outer ring, a tongue-and-groove joint is employed for joining the two pieces together, and the two pieces of the outer ring are fastened together by use of bolts with rollers intervening between the inner ring and the outer ring (see, for example, Japanese Utility Model Application Laid-Open No. H04-78328).

Incidentally, since the above-mentioned ultrathin-type cross roller bearing does not have mounting threaded holes, other members, such as a housing, a retainer plate, etc., are required for mounting the cross roller bearing, resulting in complication of mounting work. The above-mentioned rolling bearing has mounting threaded holes formed in the outer ring and the inner ring; however, since the threaded holes of the outer ring and the threaded holes of the inner ring are disposed on the radially outer and inner sides, respectively, of the rolling bearing, the thickness of the rolling bearing in the radial direction increases by an amount corresponding to the size of the threaded holes. In the case where the outer ring and the inner ring do not have the threaded holes, separate holders are used for mounting, resulting in complication of mounting work. Also, since the threaded holes of the holders are disposed on the radially outer and inner sides, respectively, of the rolling bearing, the overall radial thickness increases. In the above-mentioned cross roller bearing, the pieces of the outer ring have respective flanges formed on their outer circumferential surfaces, and screws are screwed into threaded holes of the flanges so as to fasten the pieces of the outer ring together. Accordingly, the cross roller bearing increases in thickness by the flanges. Therefore, for such a cross roller bearing, it is necessary to devise the structures of an outer ring and an inner ring, which structures allow the outer ring and the inner ring to have respective mounting portions and decrease the thickness of the cross roller bearing in the radial direction; in other words, to provide mounting holes for mounting mating members in the outer ring and the inner ring, respectively, without need to change the total radial thickness of the outer ring and the inner ring from the conventional radial thickness.

SUMMARY OF THE INVENTION

The present invention has been conceived to solve the above-described problems. One object of the present invention is to provide a cross roller bearing which allows an outer ring and an inner ring to have respective mounting portions having mounting threaded holes formed therein without need to change the total radial thickness of the outer ring and the inner ring. Another object of the present invention is to provide a cross roller bearing which allows at least one of the outer ring and the inner ring to have a notch for detecting rollers and separators rolling in a load-carrying race so as to detect the presence of a missing roller(s) or a missing separator(s) in the load-carrying race and verify the presence of all of the rollers through circumferential rolling of the rollers. Still another object of the present invention is to provide a cross roller bearing which allows removal of a cover from an insertion hole through the notch by forming the notch in a region of the insertion hole formed in at least one of the outer ring and the inner ring.

Means to Solve the Problems

The present invention provides a cross roller bearing comprising: an outer ring having a first raceway surface having a V-shaped cross section and formed on a first inner circumferential surface thereof; an inner ring having a second raceway surface having a V-shaped cross section and formed on a second outer circumferential surface thereof in such a manner as to face the first raceway surface of the outer ring, and disposed concentrically with and rotatably in relation to the outer ring; and a plurality of rollers disposed in a mutually orthogonal manner in a load-carrying race formed between the first raceway surface and the second raceway surface and a plurality of separators disposed between the rollers, the rollers and the separators being inserted into the load-carrying race through an insertion hole formed in one of the outer ring and the inner ring. The outer ring has a first mounting portion which is located axially away from the first raceway surface and to which a first mating member is mounted, and the inner ring has a second mounting portion which is located axially away from the second raceway surface and to which a second mating member is mounted. A first outer circumferential surface of the outer ring and a second inner circumferential surface of the inner ring are flat, and the first mounting portion of the outer ring does not radially protrude from the second inner circumferential surface of the inner ring while the second mounting portion of the inner ring does not radially protrude from the first outer circumferential surface of the outer ring.

Preferably, the first mounting portion of the outer ring extends axially toward a first side from a first track portion of the outer ring having the first raceway surface and is formed greater in radial wall thickness than the first track portion, and the second mounting portion of the inner ring extends axially, from a second track portion of the inner ring having the second raceway surface, toward a second side opposite the first side.

Preferably, the first mounting portion of the outer ring has a first threaded hole formed in an end surface thereof for mounting the first mating member, and the second mounting portion of the inner ring has a second threaded hole formed in an end surface thereof for mounting the second mating member.

Preferably, a cover is fitted into the insertion hole formed in the first outer circumferential surface of the outer ring; the cover is fixed to the outer ring with an axially extending fastening pin; an outer circumferential surface of the cover is flush with the first outer circumferential surface of the outer ring; and a raceway surface formed on an inner circumferential surface of the cover is flush with the first raceway surface of the outer ring.

Preferably, at least one of the outer ring and the inner ring has a semicircular or elongated notch formed therein for detecting the rollers and the separators rolling in the load-carrying race.

Preferably, the first mounting portion of the outer ring is greater in wall thickness than the first track portion of the outer ring having the first raceway surface formed thereon, and the second mounting portion of the inner ring is greater in wall thickness than the second track portion of the inner ring having the second raceway surface formed thereon.

Preferably, the outer ring has a one-piece structure in which the first mounting portion and the first track portion having the first raceway surface formed thereon are formed integrally, and the inner ring has a one-piece structure in which the second mounting portion and the second track portion having the second raceway surface formed thereon are formed integrally.

Preferably, the outer ring has at least one lubrication hole formed in the first outer circumferential surface thereof and communicating with the first raceway surface.

Effect of the Invention

As a result of being configured as mentioned above, the present cross roller bearing allows the inner and outer rings to have respective mounting threaded holes for mounting the respective mating members while having a thin-type structure without need to change the inside and outside diameters. Since the outer ring and the inner ring have one-piece structures, respectively, the outer ring and the inner ring can be ultra-thin-walled. Thus, the roller diameter can be reduced accordingly, and the entire cross roller bearing can be reduced in size and weight. Therefore, when the cross roller bearing is incorporated in a swinging portion or a turning portion of an industrial robot, an optical instrument, a medical instrument, or the like, an inertial weight can be reduced. The outer ring and the inner ring have respective mounting portions which extend in axially opposite directions from track portions having respective raceway surfaces formed thereon and which have radial wall thicknesses greater than those of the respective track portions. The mounting portions have respective radial wall thicknesses smaller than the total radial thickness of the outer ring and the inner ring to thereby reduce an overall radial thickness, and the mounting portions have mounting threaded holes for fixing the mating members to the respective mounting portions. The thick mounting portions are formed to have respective thicknesses which do not cause a change in the inside and outside diameters of the track portions having the raceway surfaces formed thereon, whereby the mounting portions can be formed while the cross roller bearing maintains a thin profile. Further, in the present cross roller bearing, the outer ring and the inner ring have the respective mounting portions; thus, when the inner ring is fitted into the outer ring, the mounting portions face the end surfaces of the outer ring and the inner ring, respectively, thereby forming labyrinth structures; and by virtue of the labyrinth structures, foreign matter is unlikely to enter the load-carrying race formed between the raceway surfaces of the outer ring and the inner ring. Also, at least one of the outer ring and the inner ring has the notch from which the rollers and the separators rolling in the load-carrying race are exposed, whereby the rolling condition of the rollers and the separators can be visually detected from outside, and the presence of a missing roller(s), the posture of the rollers, etc., can be checked. In this case, by forming the notch having a sufficient size in a region of the insertion hole formed in the outer ring or the inner ring, the cover can be removed from the insertion hole for disassembly through insertion of a jig into the notch, whereby a deficiency of the rollers or the separators caused by human error can be remedied.

BRIEF DESCRIPTION OF THE DRAWING

FIGS. 3(A) and 3(B) show the cross roller bearing of FIG. 1, wherein FIG. 3(A) is a plan view of the cross roller bearing, and FIG. 3(B) is a sectional view taken along line A-A of FIG. 3(A);

FIG. 4 is an enlarged sectional side view of the cross roller bearing of FIG. 1 in which the outer ring has the insertion hole, showing the region of the insertion hole;

FIGS. 5(A) and 5(B) show the outer ring of the cross roller bearing of FIG. 1, wherein FIG. 5(A) is a plan view of the outer ring, and FIG. 5(B) is a sectional view taken along line B-B of FIG. 5(A);

FIGS. 6(A) and 6(B) show the outer ring of the cross roller bearing of FIG. 1, wherein FIG. 6(A) is a plan view of the outer ring, and FIG. 6(B) is a sectional view taken along line C-C of FIG. 6(A);

FIGS. 7(A) and 7(B) show the inner ring of the cross roller bearing of FIG. 1, wherein FIG. 7(A) is a plan view of the inner ring, and FIG. 7(B) is a sectional view taken along line D-D of FIG. 7(A);

FIGS. 8(A) and 8(B) show a state in which mating members are mounted to the outer ring and the inner ring, respectively, wherein FIG. 8(A) is a plan view showing a state in which the mating members are mounted to the cross roller bearing, and FIG. 8(B) is a sectional view taken along line E-E of FIG. 8(A);

FIGS. 9(A) and 9(B) show a cross roller bearing according to a second embodiment of the present invention in which an inner ring has notches, wherein FIG. 9(A) is a plan view of the cross roller bearing according to the second embodiment as viewed from the inner ring side, and FIG. 9(B) is an enlarged plan view showing an F region of FIG. 9(A)

DETAILED DESCRIPTION OF THE EMBODIMENT

A cross roller bearing of the present invention implements minimization of weight, compactness, and an ultra-thin profile and is most suitably incorporated in sliding portions, swinging portions, turning portions, etc., of robots, such as industrial robots, and various types of apparatus, such as optical instruments, medical instruments, machine tools, assembling apparatus, semiconductor manufacturing apparatus, and measuring instruments. Particularly, the cross roller bearing allows the inner ring and the outer ring to have compact, thin-walled one-piece structures, respectively.

Figure 8A:
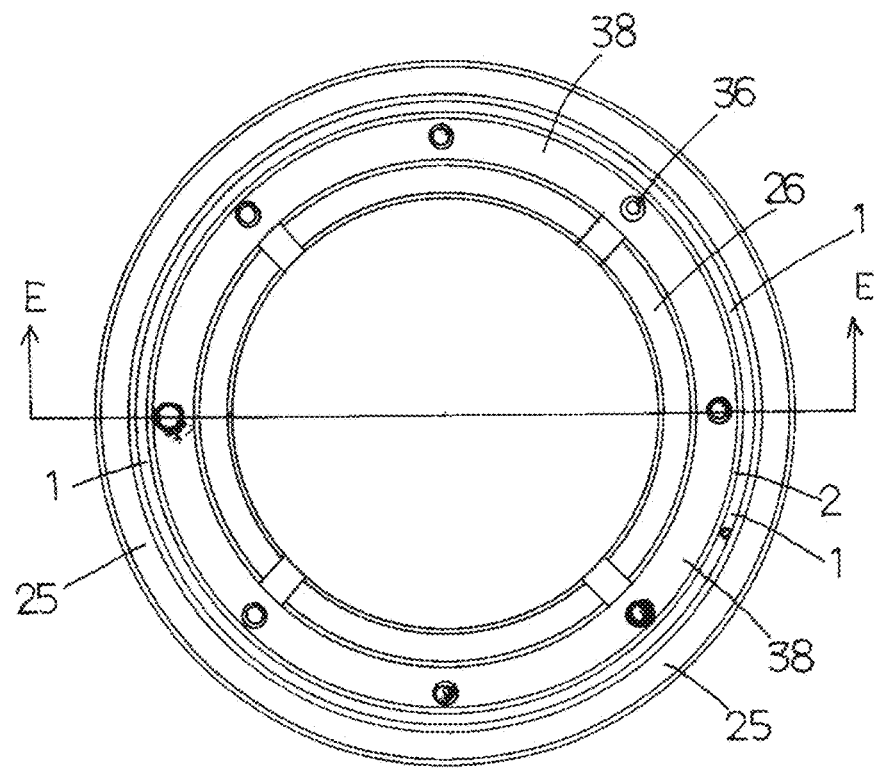
Figure 8B:
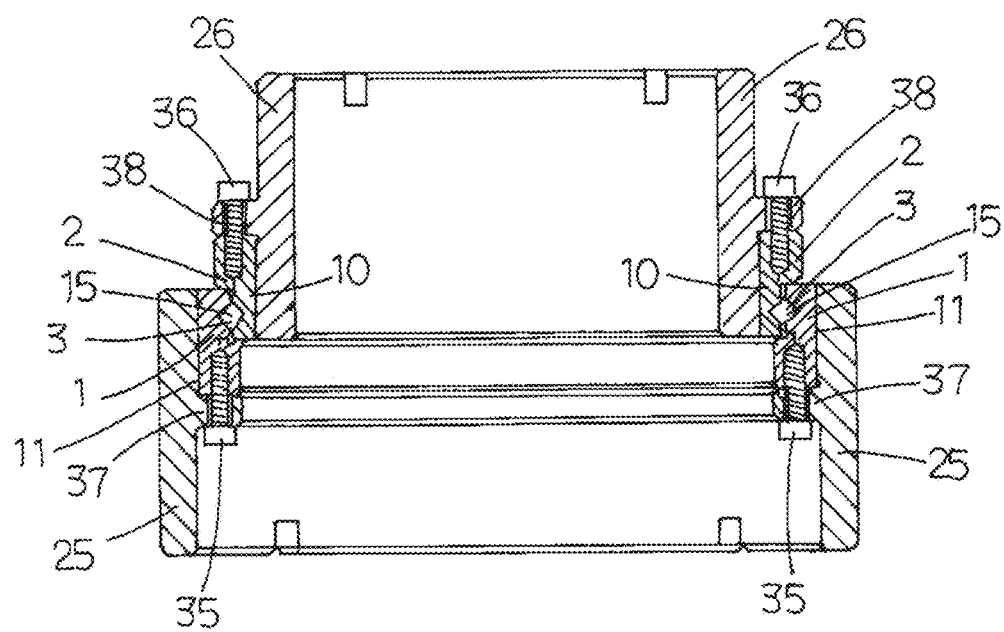

A cross roller bearing according to an embodiment of the present invention will next be described with reference to the drawings. As shown in FIG. 1 to FIGS. 8(A) and 8(B), the present cross roller bearing is favorably usable in, for example, swinging portions and turning portions of robot arms and the like, easy to handle, lightweight, and compact. The cross roller bearing of the present invention has an outer ring 1, an inner ring 2, a plurality of rollers 3, and a plurality of separators 4 (FIGS. 9(A) and 9(B)). The outer ring 1 has raceway surfaces 13 (first raceway surface) collectively forming a V-shaped cross section and formed on an inner circumferential surface 9 (first inner circumferential surface) thereof. The inner ring 2 has raceway surfaces 14 (second raceway surface) collectively forming a V-shaped cross section and formed on an outer circumferential surface 12 (second outer circumferential surface) thereof in such a manner as to face the raceway surfaces 13 of the outer ring 1, and is disposed concentrically with and rotatably in relation to the outer ring 1. The rollers 3 are disposed in a mutually orthogonal manner in a load-carrying race 15 formed between the raceway surfaces 13 and the raceway surfaces 14. The separators 4 are disposed between the rollers 3. The rollers 3 and the separators 4 are inserted into the load-carrying race 15 through an insertion hole 16 formed in one of the outer ring 1 and the inner ring 2. In the present embodiment, in order to facilitate insertion of the very small rollers 3 and separators 4, the outer ring 1 has the insertion hole 16. The outer ring 1 and the inner ring 2 are rotatable in relation to each other through the rollers 3. As shown in FIGS. 8(A) and 8(B), for example, a cylindrical mating member 25 (first mating member) is mounted to the outer ring 1, and a cylindrical mating member 26 (second mating member) is mounted to the inner ring 2.

Figure 2:
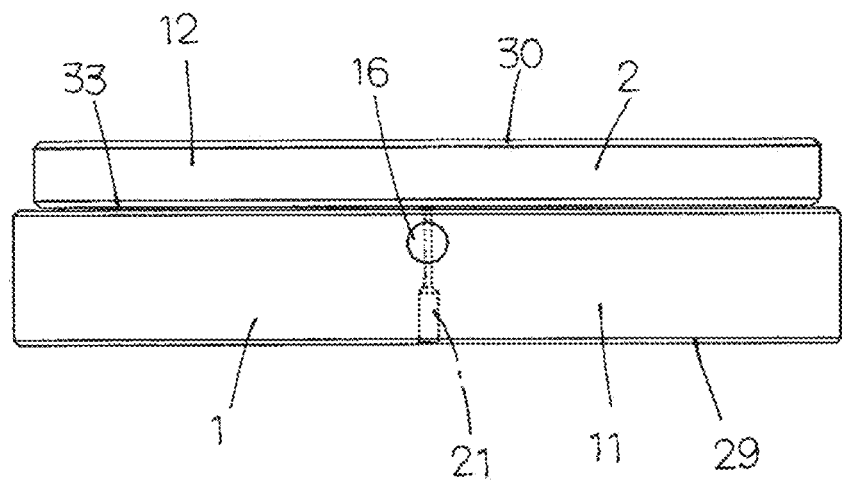
FIG. 2 is a side view of the cross roller bearing of FIG. 1 in which the outer ring has an insertion hole, showing a region of the insertion hole.
Figure 3A:
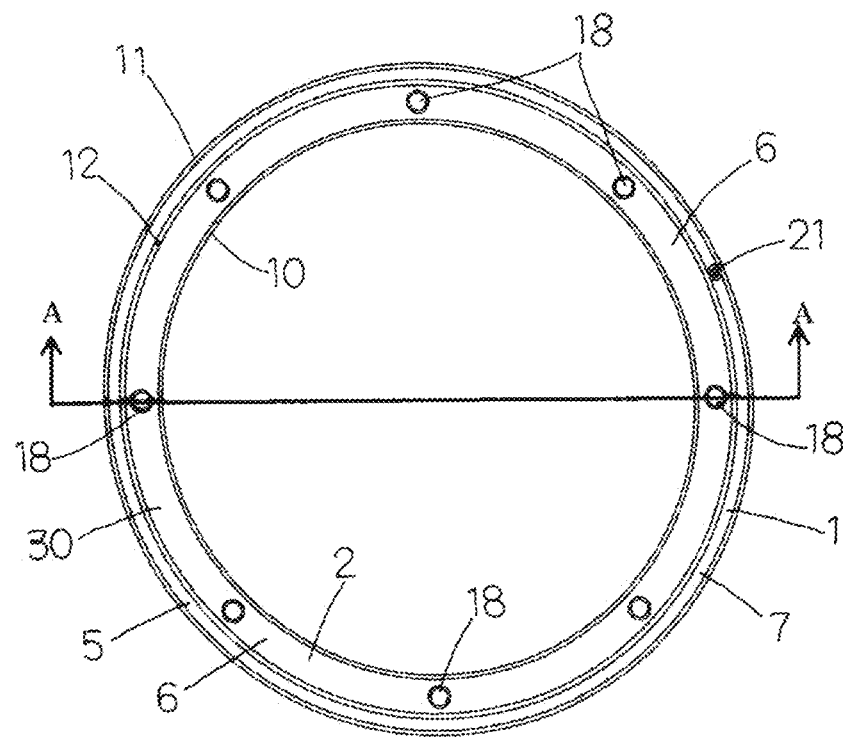
Figure 3B:
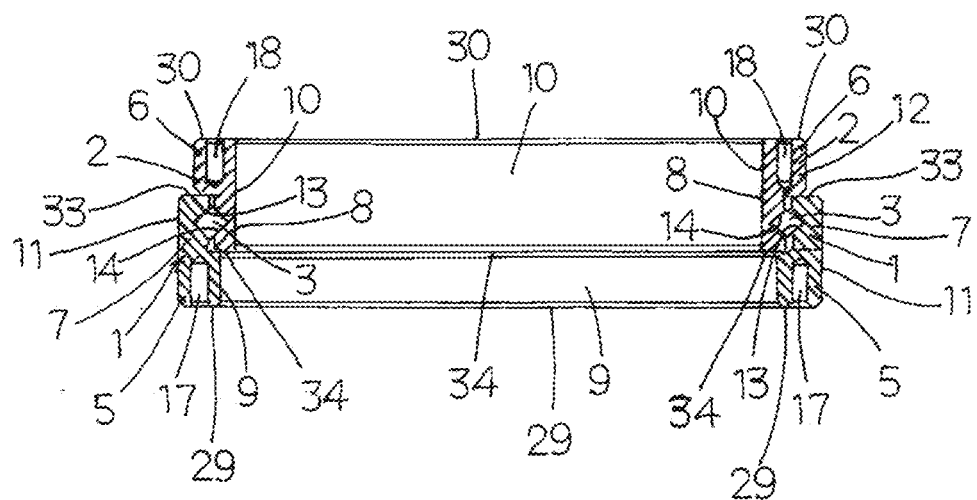
Figure 5A:
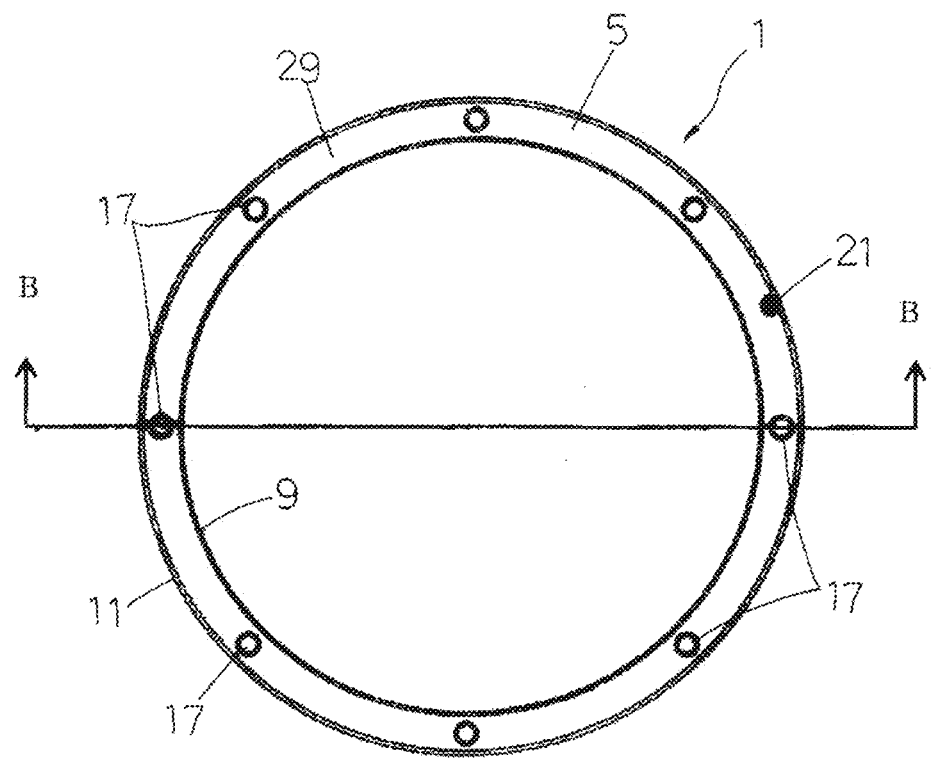
Figure 5B:
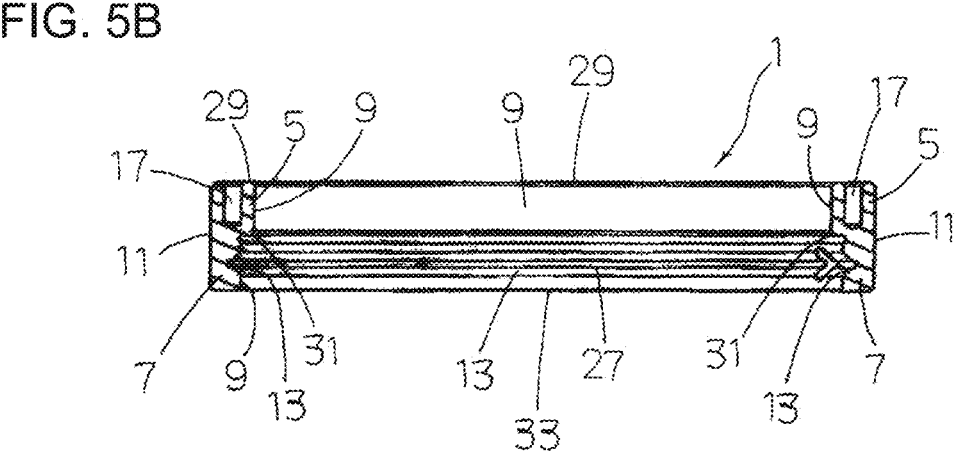
Figure 6A:
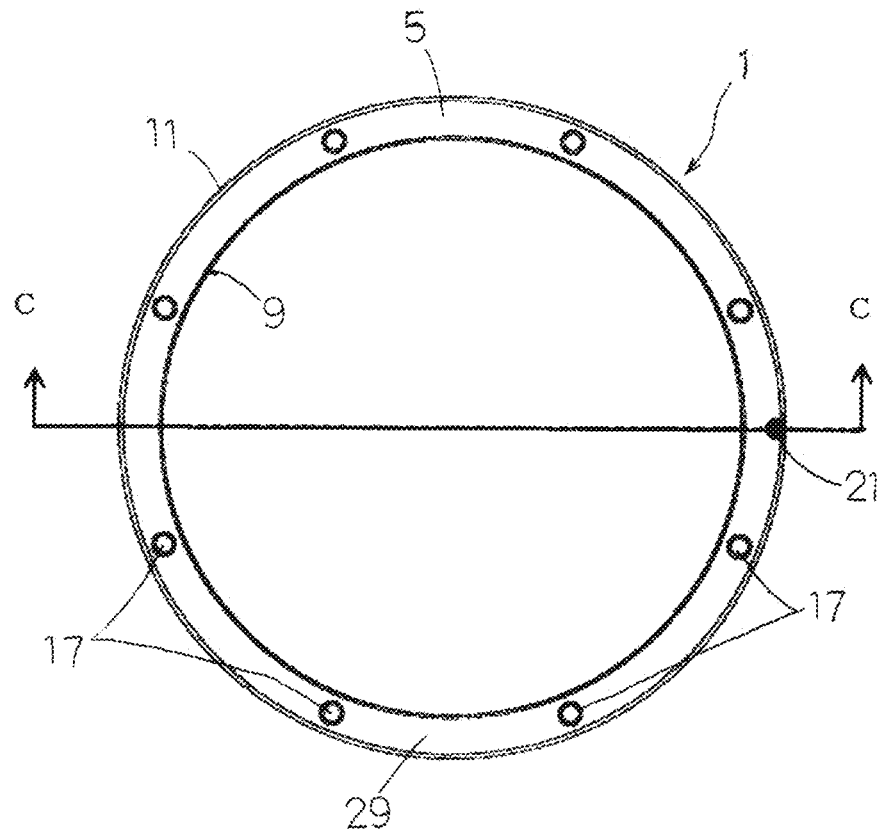
Figure 6B:
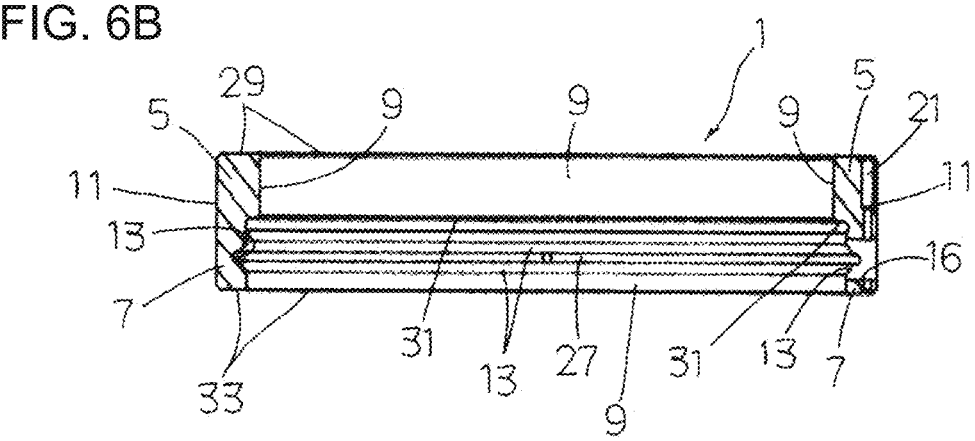
Figure 7A:
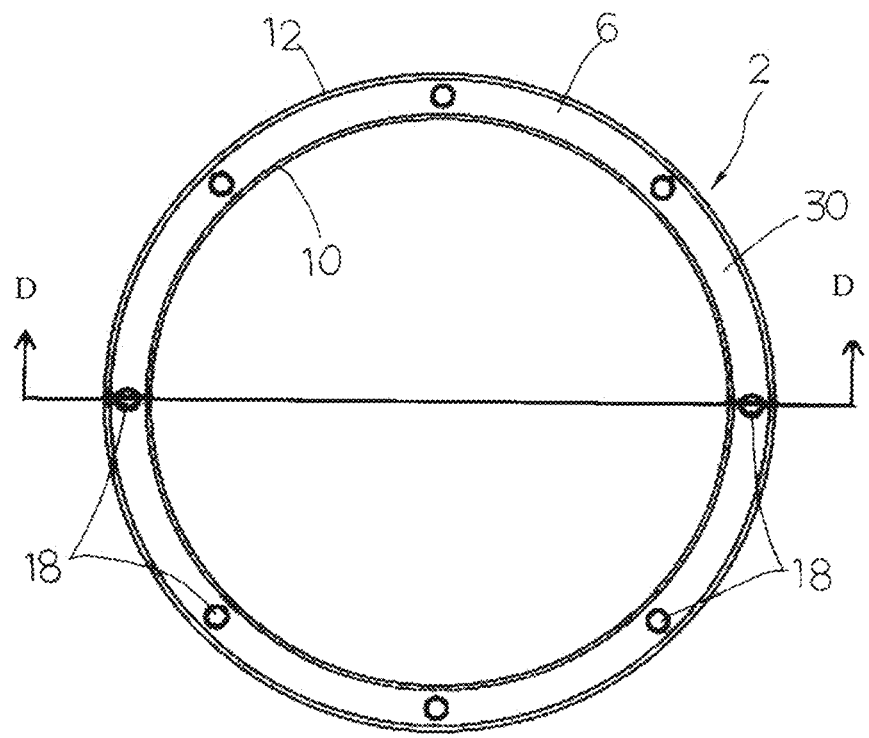
Figure 7B:
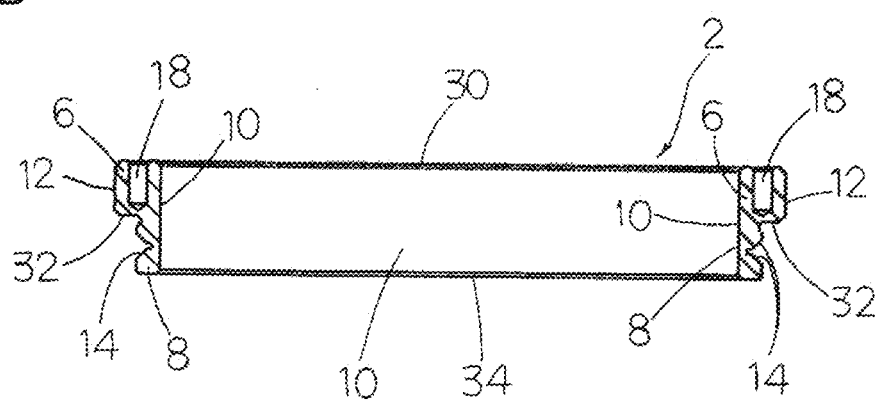

As shown in FIG. 2, the insertion hole 16 formed in the outer ring 1 is a circular hole formed at a circumferential position of the outer ring 1 and extending from an outer circumferential surface 11 (first outer circumferential surface) to the raceway surfaces 13 of the inner circumferential surface 9. The outer ring 1 has the raceway surfaces 13 collectively forming a V-shaped cross section and formed on the inner circumferential surface 9. A clearance groove 27 for a grindstone (not shown) is formed between the raceway surfaces 13. The inner ring 2 has the raceway surfaces 14 collectively forming a V-shaped cross section and formed on the outer circumferential surface 12 thereof in such a manner as to face the raceway surfaces 13 of the outer ring 1. A clearance groove 28 for a grindstone (not shown) is formed between the raceway surfaces 14. Specifically, as shown in FIG. 4, in the outer ring 1, the paired raceway surfaces 13 collectively forming a V-shaped cross section are formed orthogonally to each other with the clearance groove 27 intervening therebetween. Also, as shown in FIG. 4, in the inner ring 2, the paired raceway surfaces 14 collectively forming a V-shaped cross section and facing the paired raceway surfaces 13 are formed orthogonally to each other with the clearance groove 28 intervening therebetween.

The rollers 3 serving as rolling elements are disposed sequentially in a mutually orthogonal manner in the load-carrying race 15 formed between the raceway surfaces 13 and 14 through the insertion hole 16 formed in the outer ring 1. The separators 4 (FIGS. 9(A) and 9(B)) are disposed between the rollers 3 in the load-carrying race 15 formed between the raceway surfaces 13 and 14. Since the rollers 3 are disposed such that the adjacent rollers 3 with the separator 4 intervening therebetween are disposed orthogonally to each other, a single bearing can support a combined load of a radial load, an axial load, moment, etc. The rollers 3 and the separators 4 are inserted between the raceway surfaces 13 and 14 of the inner and outer rings 1 and 2 through the insertion hole 16 of the outer ring 1. After the rollers 3 and the separators 4 are inserted between the outer ring 1 and the inner ring 2, as shown in FIG. 4, the insertion hole 16 is closed with the cover 20. The cover 20 is fixed to the outer ring 1 by inserting a fastening pin 19 extending axially in parallel with the outer ring 1 into a pin hole 21 of the outer ring 1 and a pin hole 41 of the cover 20. The outer ring 1 has the pin hole 21 into which the fastening pin 19 is inserted, and an insertion hole 43 communicating with the pin hole 21 and having a diameter greater than that of the pin hole 21. The fastening pin 19 can be removed by inserting a jig or the like from the insertion hole 43. The cover 20 has raceway surfaces 39 and a clearance groove 42 which are flush with the raceway surfaces 13 and the clearance groove 27, respectively, of the outer ring 1.

An outer circumferential surface 40 of the cover 20 is flush with the outer circumferential surface 11 of the outer ring 1. By virtue of such flush structure, the rollers 3 roll smoothly. The fastening pin 19 is fitted into the outer ring 1 and the cover 20 in such a manner as to extend from one end surface of the outer ring 1 to the other end surface of the outer ring 1 while extending through the cover 20, thereby fixing the cover 20 to the outer ring 1. A plurality of the rollers 3 are inserted in a mutually orthogonal manner between the raceway surfaces 13 and 14 which define a circumferential passage, as follows: of two adjacent rollers 3, one roller 3 rolls under load in such a manner that its rolling surface is in contact with one of the two raceway surfaces 13 of the outer ring 1 and with one of the raceway surfaces 14 of the inner ring 2 facing the one raceway surface 13, whereas the other roller 3 orthogonal to the one roller 3 rolls under load in such a manner that its rolling surface is in contact with the other raceway surface 13 of the outer ring 1 and with the other raceway surface 14 of the inner ring 2. Each of the separators 4 is disposed between the one roller 3 and the other roller 3, has, for example, a circular columnar shape, and is inserted in such a posture that its opposite end surfaces are in contact with the respective rolling surfaces of the rollers 3. Each of the separators 4 is disposed at least between the rollers 3; in some cases, two separators 4 are disposed in series between the rollers 3. In the present cross roller bearing, the separators 4 have a shape suited for disposition at least between the rollers 3 and suited for miniaturization.

In the present cross roller bearing, particularly, a mounting portion 5 (first mounting portion) of the outer ring 1 is formed greater in wall thickness than a track portion 7 (first track portion) of the outer ring 1 having the raceway surfaces 13, and a mounting portion 6 (second mounting portion) of the inner ring 2 is formed greater in wall thickness than a track portion 8 (second track portion) of the inner ring 2 having the raceway surfaces 14. Specifically, in the present cross roller bearing, the outer ring 1 has a one-piece structure in which the mounting portion 5 and the track portion 7 having the raceway surfaces 13 formed thereon are formed integrally, and the inner ring 2 has a one-piece structure in which the mounting portion 6 and the track portion 8 having the raceway surfaces 14 formed thereon are formed integrally. Further, the outer circumferential surface 11 (first outer circumferential surface) of the outer ring 1 is a flat cylindrical surface, and the inner circumferential surface 10 (second inner circumferential surface) of the inner ring 2 is a flat cylindrical surface. In the present cross roller bearing, the dimension between the outer circumferential surface 11 of the outer ring 1 and the inner circumferential surface 10 of the inner ring 2 is the thickness of the cross roller bearing. The rollers 3 and the separators 4 roll and run, respectively, in the load-carrying race 15 formed between the raceway surfaces 13 formed on the track portion 7 of the outer ring 1 and the raceway surfaces 14 formed on the track portion 8 of the inner ring 2. The rollers 3 are disposed in the load-carrying race 15 in such a manner that their inclinations are changed alternatingly by 90 degrees along the circumferential direction, and the separators 4 are disposed between the rollers 3.

In the cross roller bearing, the outer ring 1 has the mounting portion 5 for mounting the mating member 25 thereto, and the inner ring 2 has the mounting portion 6 for mounting the mating member 26 thereto. The mounting portion 5 and the mounting portion 6 extend axially opposite each other from the track portion 7 having the raceway surface 13 formed thereon and from the track portion 8 having the raceway surface 14 formed thereon, respectively. The mounting portion 5 and the mounting portion 6 are formed greater in radial wall thickness than the track portions 7 and 8, respectively, and the radial wall thicknesses of the mounting portions 5 and 6 are smaller than the total of the radial wall thicknesses of the track portion 7 of the outer ring 1 and the track portion 8 of the inner ring 2 and a gap between the track portions 7 and 8. In other words, the mounting portion 5 of the outer ring 1 is formed to such a size as not to radially protrude from the inner circumferential surface 10 of the inner ring 2, and the mounting portion 6 of the inner ring 2 is formed to such a size as not to radially protrude from the outer circumferential surface 11 of the outer ring 1.

Specifically, the outer ring 1 is formed such that a stepped end face 31 is the boundary between the track portion 7 and the mounting portion 5, and the inner ring 2 is formed such that a stepped end face 32 is the boundary between the track portion 8 and the mounting portion 6. In the cross roller bearing, as shown in FIG. 4, the outer ring 1 and the inner ring 2 are assembled together such that the stepped end face 31 of the outer ring 1 and an end surface 34 of the track portion 8 of the inner ring 2 face each other with a gap formed therebetween while the stepped end face 32 of the inner ring 2 and an end surface 33 of the track portion 7 of the outer ring 1 face each other with a gap formed therebetween. Also, in the cross roller bearing, the mounting portion 5 of the outer ring 1 has threaded holes 17 (first threaded hole) formed in an end surface 29 (first end surface) thereof for mounting the mating member 25, and the mounting portion 6 of the inner ring 2 has threaded holes 18 (second threaded hole) formed in an end surface 30 (second end surface) thereof for mounting the mating member 26. In the present embodiment, the mating member 25 to be mounted to the outer ring 1 has a flange portion 37 having mounting holes and extending radially inward from an inner circumferential surface thereof, and the mating member 26 to be mounted to the inner ring 2 has a flange portion 38 having mounting holes and extending radially outward from an outer circumferential surface thereof. In the present cross roller bearing, the mating member 25 is fixed to the outer ring 1 in such a manner that screws 35 are inserted through the respective mounting holes of the flange portion 37 and screwed into the respective threaded holes 17 of the end surface 29 of the outer ring 1. The mating member 26 is fixed to the inner ring 2 in such a manner that screws 36 are inserted through the respective mounting holes of the flange portion 38 and screwed into the respective threaded holes 18 of the end surface 30 of the inner ring 2. Although unillustrated, no particular limitation is imposed on the mating members 25 and 26 so long as mating members can be mounted to the mounting portions 5 and 6. For example, the mating members may have a plate shape.

Figure 1:
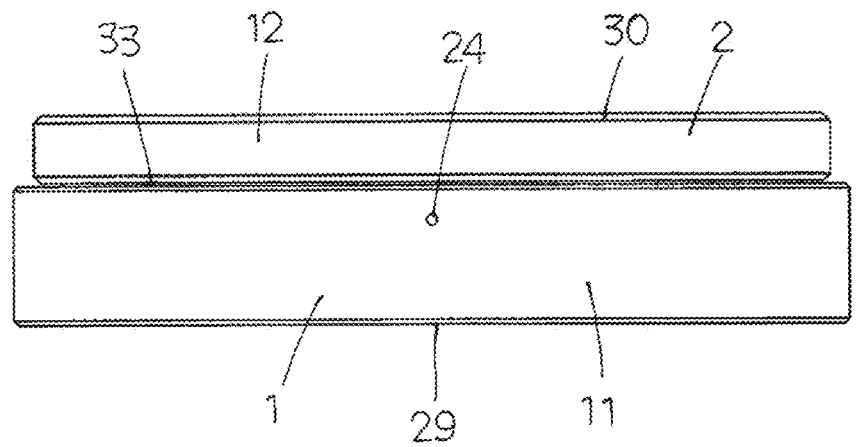
FIG. 1 is a side view of a cross roller bearing according to a first embodiment of the present invention in which an outer ring has a lubrication hole.

In the present cross roller bearing, the cover 20 serving as a plug is plugged into the insertion hole 16 formed in the outer circumferential surface 11 of the outer ring 1; the cover 20 is fixed to the outer ring 1 by inserting the axially extending fastening pin 19 into the pin hole 21; and the outer circumferential surface 40 of the cover 20 is flush with the outer circumferential surface 11 of the outer ring 1. Also, in the present cross roller bearing, as shown in FIG. 1, at least one lubrication hole 24 is formed in the outer circumferential surface 11 of the outer ring 1 in such a manner as to communicate with the raceway surface 13. In the present embodiment, the lubrication hole 24 is formed at a position located circumferentially 90 degrees away from the insertion hole 16; however, a plurality of the lubrication holes 24 can be formed along the circumferential direction. Further, in the present cross roller bearing, the outer ring 1 has the mounting portion 5 extending from the track portion 7, and the inner ring 2 has the mounting portion 6 extending from the track portion 8. When the inner ring 2 is fitted into the outer ring 1, the mounting portion 6 of the inner ring 2 faces the end surface 33 of the outer ring 1, and the mounting portion 5 of the outer ring 1 faces the end surface 34 of the inner ring 2, thereby forming labyrinth structures. By virtue of the labyrinth structures, foreign matter is unlikely to enter the load-carrying race 15 formed between the facing raceway surfaces 13 and 14 of the outer ring 1 and the inner ring 2. Therefore, there is no need to provide a seal between the outer ring 1 and the inner ring 2.

Figure 9A:
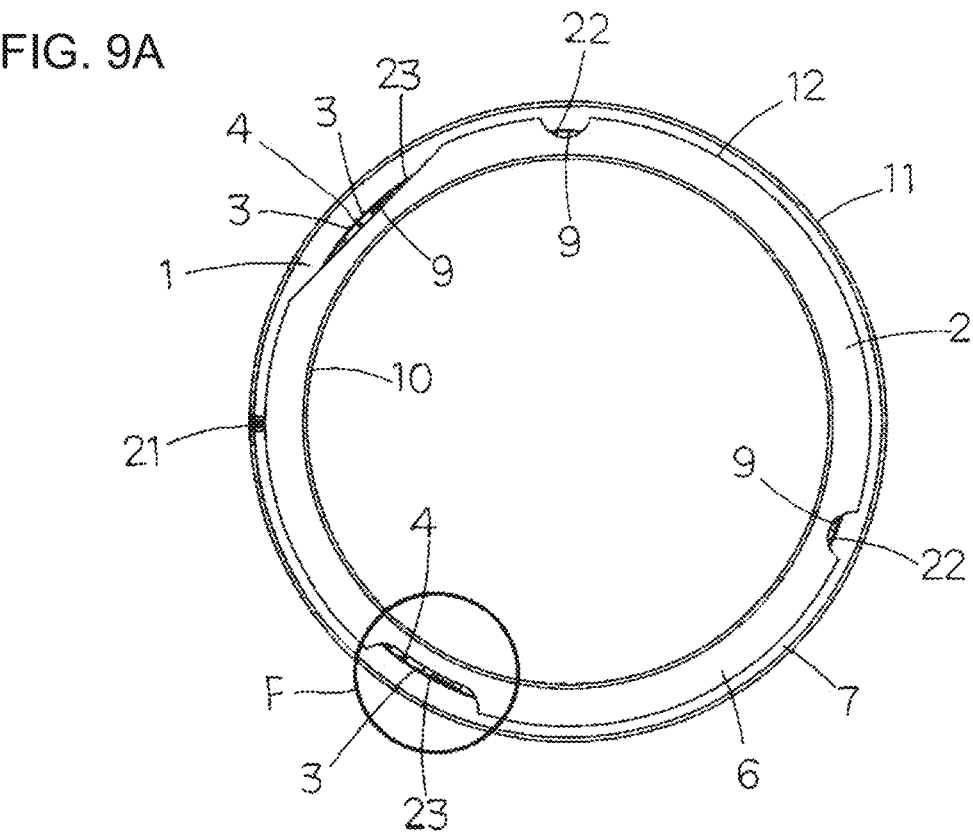
Figure 9B:
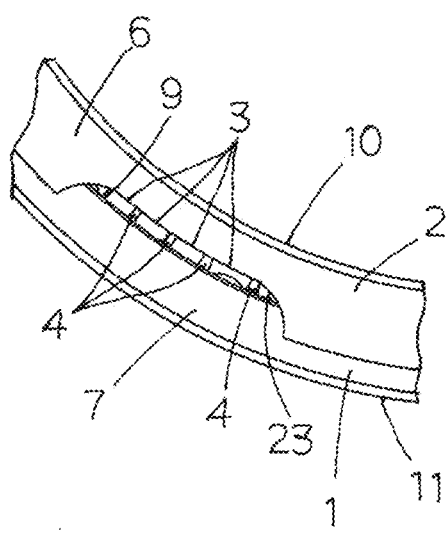
Figure 10:
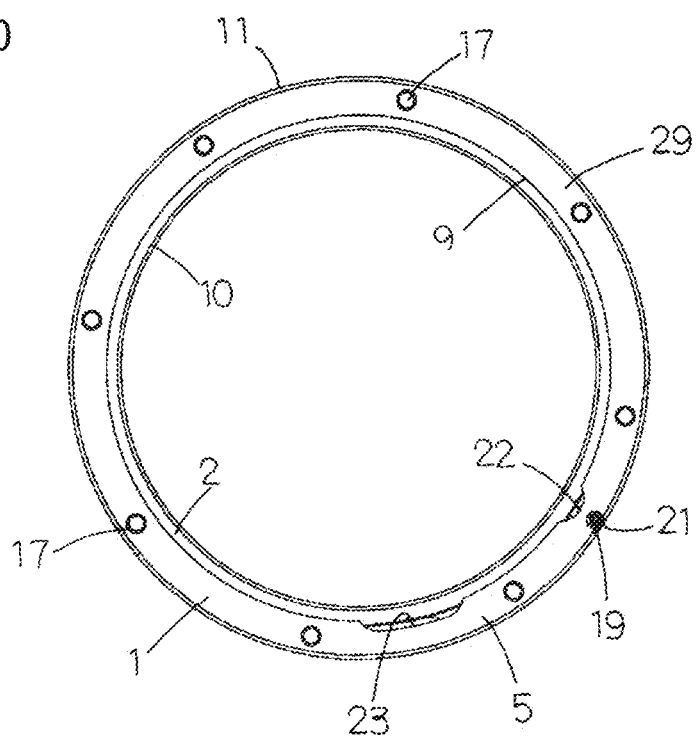
FIG. 10 is a plan view of a cross roller bearing according to a third embodiment of the present invention in which an outer ring has notches.

Next, with reference to FIGS. 9(A) and 9(B) and FIG. 10, a cross roller bearing according to another embodiment of the present invention will be described. In the present cross roller bearing, at least one of the outer ring 1 and the inner ring 2 has semicircular and elongated notches 22 and 23 formed therein for detecting the rollers 3 rolling and the separators 4 running in the load-carrying race 15. Specifically, in FIGS. 9(A) and 9(B), the notches 22 and 23 are formed in the inner ring 2. In the present embodiment, two semicircular notches 22 and two elongated notches 23 are formed. In FIGS. 9(A) and 9(B), although the threaded holes 18 formed in the inner ring 2 are not illustrated, the notches 22 and 23 are formed in the inner ring 2 at such positions as not to interfere with the threaded holes 18. In FIG. 10, one notch 22 and one notch 23 are formed in the outer ring 1. The notches 22 and 23 may be formed in either the outer ring 1 or the inner ring 2, depending on an apparatus to which the cross roller bearing is applied. Notably, the notches 22 and 23 are formed in the outer ring 1 at such positions as not to interfere with the threaded holes 17 formed in the outer ring 1.

What is claimed is:

1. A cross roller bearing comprising:
    an outer ring having a first raceway surface having a V-shaped cross section and formed on a first inner circumferential surface thereof;
    an inner ring having a second raceway surface having a V-shaped cross section and formed on a second outer circumferential surface thereof in such a manner as to face the first raceway surface of the outer ring, the inner ring being disposed concentrically with and rotatably in relation to the outer ring; and
    a plurality of rollers disposed in a mutually orthogonal manner in a load-carrying race formed between the first raceway surface and the second raceway surface and a plurality of separators disposed between the rollers, the rollers and the separators being inserted into the load-carrying race through an insertion hole formed in the outer ring,
    wherein the outer ring has a first mounting portion which is located axially away from the first raceway surface and to which a first mating member is mounted, and the inner ring has a second mounting portion which is located axially away from the second raceway surface and to which a second mating member is mounted,
    wherein the first mounting portion of the outer ring extends axially toward a first side from a first track portion of the outer ring having the first raceway surface and is formed greater in radial wall thickness than the first track portion, and the second mounting portion of the inner ring extends axially, from a second track portion of the inner ring having the second raceway surface, toward a second side opposite the first side,
    wherein the second mounting portion of the inner ring is greater in radial wall thickness than the second track portion of the inner ring having the second raceway surface formed thereon, and
    a first outer circumferential surface of the outer ring and a second inner circumferential surface of the inner ring are flat, wherein the first mounting portion of the outer ring does not extend radially beyond the second inner circumferential surface of the inner ring, and the second mounting portion of the inner ring does not extend radially beyond the first outer circumferential surface of the outer ring.

2. A cross roller bearing according to claim 1, wherein the first mounting portion of the outer ring has a first threaded hole formed in an end surface thereof for mounting the first mating member, and the second mounting portion of the inner ring has a second threaded hole formed in an end surface thereof for mounting the second mating member.

3. A cross roller bearing according to claim 1, wherein a cover is fitted into the insertion hole formed in the first outer circumferential surface of the outer ring; the cover is fixed to the outer ring with an axially extending fastening pin; an outer circumferential surface of the cover is flush with the first outer circumferential surface of the outer ring; and a raceway surface formed on an inner circumferential surface of the cover is flush with the first raceway surface of the outer ring.

4. A cross roller bearing according to claim 1, wherein at least one of the outer ring and the inner ring has a semicircular or elongated notch formed therein for detecting the rollers and the separators rolling in the load-carrying race.

5. A cross roller bearing according to claim 1, wherein the outer ring has a one-piece structure in which the first mounting portion and the first track portion having the first raceway surface formed thereon are formed integrally, and the inner ring has a one-piece structure in which the second mounting portion and the second track portion having the second raceway surface formed thereon are formed integrally.

6. A cross roller bearing according to claim 1, wherein the outer ring has at least one lubrication hole formed in the first outer circumferential surface thereof and communicating with the first raceway surface.

* * * * *